United States Patent [19]

Shiromizu et al.

[11] Patent Number: 4,837,629
[45] Date of Patent: Jun. 6, 1989

[54] IMAGE PICKUP METHOD USING A CCD-TYPE SOLID STATE IMAGE PICKUP DEVICE WITH CHARGE DISSIPATION

[75] Inventors: Yasuyuki Shiromizu; Kenji Urata, both of Kawasaki, Japan

[73] Assignee: Fuji Electric Co., Ltd., Kawasaki, Japan

[21] Appl. No.: 180,881

[22] Filed: Apr. 13, 1988

[30] Foreign Application Priority Data

Apr. 14, 1987 [JP] Japan .................... 62-89764

[51] Int. Cl.⁴ ........................................ H04N 3/15
[52] U.S. Cl. .................... 358/213.19; 358/213.15; 358/213.26
[58] Field of Search ............ 358/213.26, 213.19, 358/213.31, 213.29, 213.22; 357/24 LR

[56] References Cited

U.S. PATENT DOCUMENTS

| | | | |
|---|---|---|---|
| 4,472,744 | 9/1984 | Inoue et al. | 358/213.29 |
| 4,564,766 | 1/1986 | Kuroda et al. | 358/213.22 |
| 4,573,078 | 2/1986 | Rentsch et al. | 358/213.26 |
| 4,603,343 | 7/1986 | Matsumoto et al. | 358/24 LR |
| 4,605,862 | 8/1986 | Takeshita | 358/213.31 |
| 4,620,231 | 10/1986 | Kosonocky | 358/213.31 |
| 4,651,215 | 3/1987 | Bell et al. | 358/213.26 |
| 4,742,395 | 5/1988 | Nagai et al. | 358/213.19 |

Primary Examiner—Jin F. Ng
Assistant Examiner—Stephen Brinich
Attorney, Agent, or Firm—Brumbaugh, Graves, Donohue & Raymond

[57] ABSTRACT

In the CCD-type solid state image pickup device described in the specification, a photodetection unit has an overflow drain structure and a vertical CCD register receives electric charges from the photodetection unit and a horizontal CCD register receives charges from the vertical CCD register. Charges are transferred from the vertical CCD register at a higher rate than normal and, to prevent accumulation of charges in the horizontal CCD register, an interval is provided in which unused charges are drained through the vertical CCD register.

1 Claim, 7 Drawing Sheets

IMAGE PICKUP METHOD USING A CCD-TYPE SOLID STATE IMAGE PICKUP DEVICE WITH CHARGE DISSIPATION

BACKGROUND OF THE INVENTION

This invention relates to an image pickup method using a CCD (charge-coupled device) type solid state image pickup device as an image input device such as a television camera.

FIG. 1 is a plan view roughly showing a conventional CCD-type solid state image pickup device. In FIG. 1, an input 1 supplies vertical transfer clock signals, a horizontal transfer clock is supplied at an input 2, and an image signal obtained by the image pickup operation is produced at an output 3. An array of photosensitive elements 4 corresponding to image pixels supplies signals to corresponding vertical shift registers 5, which in turn supply signals to a horizontal shift register 6 in response to read-out pulses on a line 7.

In the operation of a raster scanning system of the type shown in FIG. 1 in which the image signals are read from respective photosensitive elements 4 using read-out pulses 7 and transferred into the vertical shift register 5, and then transferred from the vertical shift register to the horizontal shift register 6 using vertical transfer clock pulses 1 and the data is read as an image signal output 3 from the horizontal shift register 6 using horizontal transfer clock pulses from the input 2, reading of an image requires a relatively long interval, such as 1/30th second. This requires a long image-exposure time, thereby hindering high-speed image pickup if an interlace system employing the NTSC system is used.

If the image signal received by the vertical shift register 5 is transferred to the horizontal shift register 6 using an especially high-speed vertical transfer clock by modifying the raster scanning system to a nonraster scanning system, and if the image signal is read out of the horizontal shift register 6 in a short time using a higher-speed horizontal transfer clock and discarded (the scanning for such discard is hereinafter referred to as the nonraster scan), and if the image signals which are formed by the photodetection of the respective photosensors in that short time are then reread and taken as an output, the image exposure time can be shortened and high-speed image pickup can be performed so that an unblurred image signal can be obtained even if the object is moving.

FIG. 2a is a schematic cross-sectional view of a portion M of a CCD structure in which the corresponding portions of one photosensitive element 4 and a vertical shift register 5 of FIG. 1 are included. In other words, FIG. 2a shows an MOS-type CCD pixel structure having an overflow drain structure for eliminating excessive signal charges which may be the cause of blooming and/or smear.

FIG. 2b illustrates schematically the distribution of energy levels at a time $t_1$ in the structure of FIG. 2a. FIG. 2c illustrates the distribution of energy levels at another time $t_2$ in the same structure.

In FIG. 2a, the reference numeral 11 denotes a one-pixel image area. FIGS. 2a and 2b show channel stops 12, a V-CCD 13 corresponding to a vertical shift register 5 in FIG. 1, a read-out gate 14, a photosensitive area 15, an overflow control gate 16, and an overflow drain 17. In FIG. 2a, the structure includes an Al photoshield 18, a transparent electrode 19, an insulating film 20, and an electrode 21. FIGS. 2b and 2c illustrate signal charges 22 and overflow charges 23.

In the symbol representation of P+, N+ and P−, + and − indicate that the impurity densities are higher or lower, respectively. Reference character P denotes a P-type semiconductor and N denotes an N-type semiconductor, as usual.

FIG. 3 is a timing chart for the vertical transfer clock signals at the input 1 of FIG. 1 and the read-out pulses 7 applied to the device shown in FIG. 2a.

The operation of the system will now be described with reference to FIGS. 2a, 2b, 2c and 3.

In FIG. 2a, a bias potential $V_{SG}$ is applied to the transparent electrode 19. Vertical transfer clock pulses 1 and read-out pulses 7, shown in FIG. 3, are applied to the electrode 21. Synthesis of a clock signal 1 and a read-out pulse 7 will result in a three-value ($V_H$, $V_M$ and $V_L$) signal as shown in FIG. 3.

A distribution of electron energy levels during storage of signal charges in the device of FIG. 2a, for example, at a time $t_1$ (FIG. 3) is shown in FIG. 2b. At the time $t_1$, namely, when no read-out pulse 7 is applied, the transparent electrode 19 is impressed with a bias voltage $V_{SG}$, and the energy level is lowered by a potential difference $V_{SG}$, corresponding to the bias voltage $V_{SG}$ between the photosensitive section 15 and overflow drain 17. As a result, a well for storage of electric charges is formed.

If a vertical transfer clock pulse 1 is applied to the electrode 21, the energy levels will be lowered by potential differences $V_M'$ and $V_L'$ corresponding to the potential levels $V_M$ and $V_L$ of the transfer clock pulse 1 between the overflow drain 17 and the read-out gate 14, and thus a well for storage of electric charges will be formed.

As is clear from FIG. 3, the following relationship holds:

$$V_{M'} > V_{L'}$$

In FIG. 2b, the relationship $P_A > P_B$ holds where $P_B$ is the magnitude of a potential barrier produced at the junction between the photosensitive section 15 and the overflow control gate 16 of the device and $V_{SG'} - V_{M'} = P_A$.

If light enters the solid state image pickup device, electrons are optically excited where the layer 20 is not covered with the Al photoshield 18, and they are stored as electric charges in the electron well in the photosensitive section 15.

The quantity of electric charge stored in the well is limited by the potential barrier $P_B$, and any electric charges 23 overflowing the barrier $P_B$ flow out via the overflow control gate 16 to the overflow drain 17 and are then discharged from the image pickup device.

The potential barrier $P_B$ is usually selected so that the total charge on the photosensitive section 15 does not exceed the charge which can be handled by the V-CCD 13. The magnitude of the barrier is determined by the difference in the impurity densities of the semiconductors constituting the photosensitive section 15 and the overflow control gate 16.

Application of a read-out pulse at a time $t_2$ as shown in FIG. 3 will be described with reference to FIG. 2c. If a read-out pulse 7 is applied to the electrode 21 of FIG. 1, the energy level will be lowered by a level difference $V_H'$ corresponding to the potential $V_H$ of the read-out pulse 7 between the overflow drain 17 and the read-out gate 14. If $V_H' - V_M' = P_C$, the energy level will be further lowered by a level corresponding to a potential barrier $P_C$ compared to the level shown in FIG. 2b.

At this time, the following condition should hold:

$$V_H' \geq V_{SG}'$$

Thus, the energy level of read-out gate 14 is lowered compared to the photosensitive section 15 and the signal charges 22 flow via the read-out gate 14 into the V-CCD 13 and are read.

It is to be noted that a channel stop 12 is provided between the V-CCD 13 and the adjacent pixel overflow drain 17 such that no electric charges 22 on the V-CCD 13 leak out.

At a time $t_3$ when a vertical transfer clock pulse 1 is applied, the energy level difference between the read-out gate 14 and the photosensitive section 15 will be further increased because:

$$P_A' > P_A \text{ if } V_{SG}' - V_L' = P_A'$$

At present, the electric charge transfer system for one known CCD includes a four-phase clock system. Herein, as an example, the structure of a CCD which employs a three-phase clock system is shown in FIG. 4a, while fluctuations in the electron energy level of the CCD at the respective timings by three-phase transfer clock pulses 25a, 25b and 25c, such as are shown in FIG. 5, are illustrated in FIG. 4b.

FIG. 4a shows a V-CCD 13 corresponding to the vertical shift register 5 of FIG. 1 having electrodes 21. The V-CCD 13 of FIG. 4a receives the inflow signal charges shown in FIG. 2c.

In FIGS. 4a, 4b and 5, when the time shifts from Ta to Tc, the clock pulse 25b changes from low L to high H while the clock pulse 25a changes from high H to low L. This shifts the charge well by a distance corresponding to one electrode 21 to the right as viewed in FIG. 4a, moving the signal charges 22 in the well by a distance corresponding to one electrode 21. Such shifting of electric charges 22 is repeated as shown in FIG. 4b until the time Tg to thereby transfer signal charges 22 for one pixel.

In the foregoing, description has been made with respect to FIG. 1 as follows: if the image signal taken into vertical shift register 5 is transferred to horizontal shift register 6 in a nonraster scanning system by modifying a raster scanning system using an especially high-speed vertical transfer clock, and if the image signal is read out of the horizontal shift register 6 in a short time using a much higher-speed horizontal transfer clock and discarded, and if the image signal formed by the photodetection of the respective photosensors in that short time is then reread out and taken as an output, then a short exposure time will be obtained to permit high-speed image pickup.

If the quantity of electric charges read out of the horizontal shift register 6 and discarded as useless is large and greater than the discharge capacity of the horizontal shift register 6, the charges may remain in the horizontal shift register 6 for a time without being discharged. As a result, the remaining charges are added to the next electric charges received as an image signal is read out next, such as the electric charges constituting the edge portion of the image, to thereby distort part of the received image and deteriorate the image quality.

SUMMARY OF THE INVENTION

The object of this invention is to solve the above problems and eliminate the retention of useless electric charges in the horizontal shift register by improving the capacity of the register to discharge useless charges, and to prevent the occurrence of distortion in the image with a method using a conventional CCD-type solid state image pickup device which is capable of performing image pickup at high speed. In othe words, the object of this invention is to provide an image pickup method in which distortion in the image does not occur using a CCD-type solid state image pickup device.

These and other objects of the invention are attained by transferring charges from a photosensitive element to a vertical CCD register in accordance with transfer clock signals, and reducing the potential barrier in the vertical CCD register in the clock phase which the transfer clock assumes when charges are discharged from the horizontal CCD register so that the charges in the horizontal CCD register flow back to the photosensitive element through the vertical CCD register and are also discharged from the overflow drain of the photosensitive element without encountering a potential barrier.

BRIEF DESCRIPTION OF THE DRAWINGS

Further objects and advantages of the invention will be apparent from a reading of the following description in conjunction with the accompanying drawings, in which:

FIG. 3 is a timing chart for the vertical transfer clock and read-out pulses applied to the device shown in FIG. 2a;

DESCRIPTION OF PREFERRED EMBODIMENT

The invention will now be described with reference to FIGS. 6a, 6b and 6c.

Figure 1:
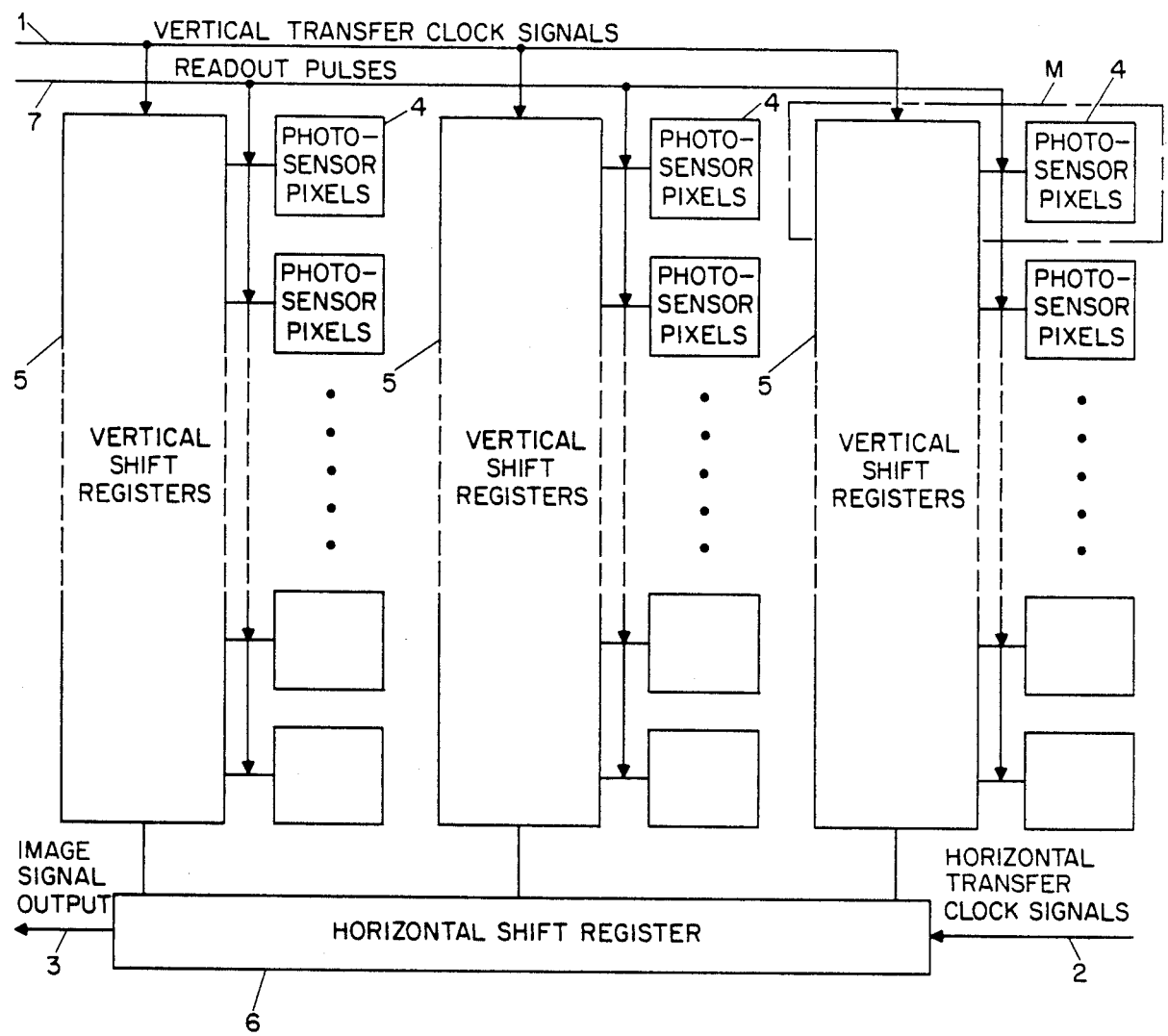
FIG. 1 is a schematic block diagram showing a conventional CCD-type solid state image pickup device.
Figure 3:
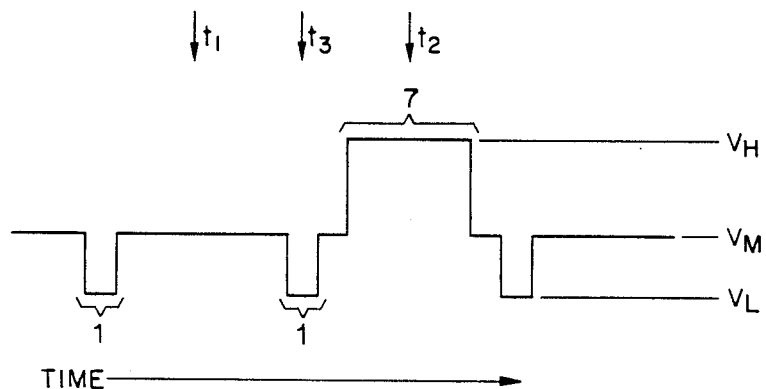
Figure 2A:
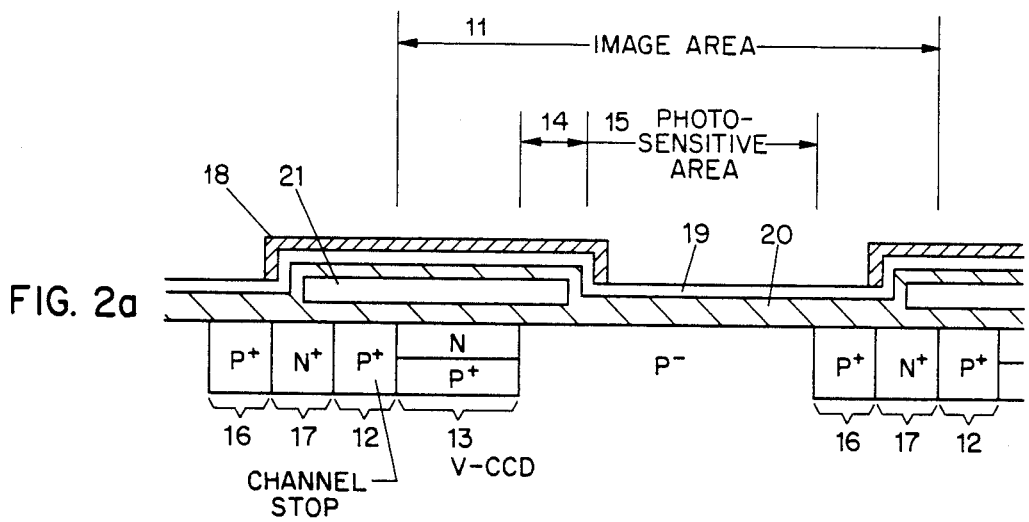
FIG. 2a is a cross-sectional view of an MOS-type CCD pixel structure and FIGS. 2b and 2c illustrating the distribution of energy levels therein.
Figure 2B:
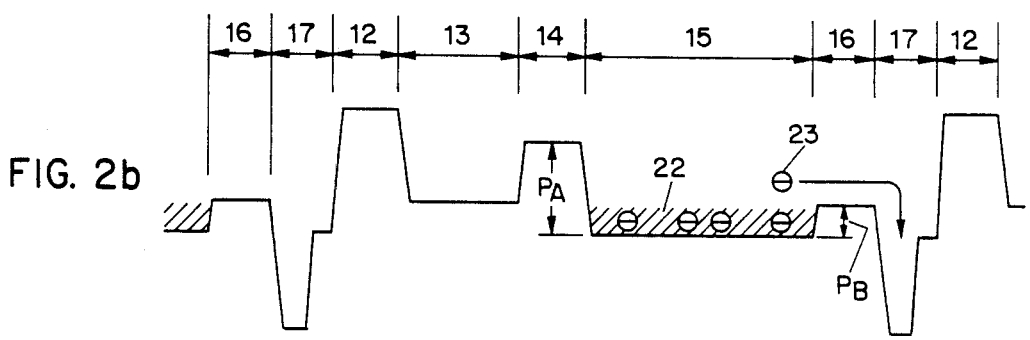
Figure 2C:
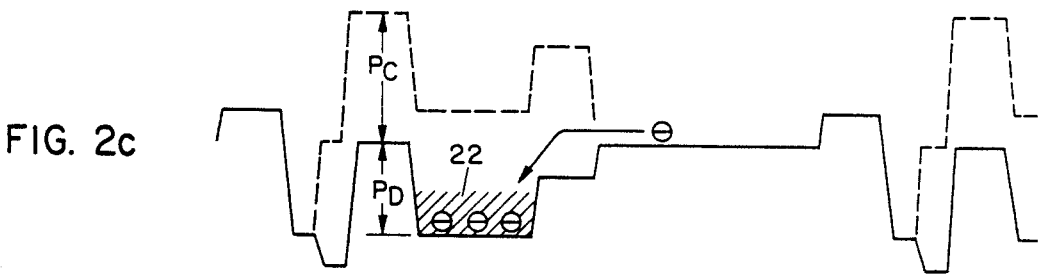
Figure 4A:
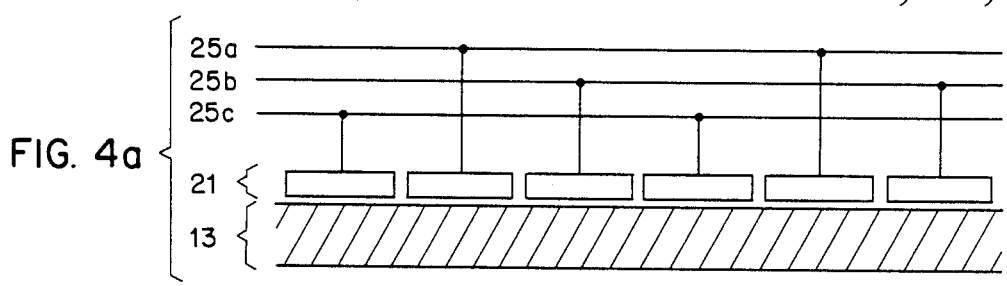
FIG. 4a is a schematic view showing a CCD structure which employs a three-phase clock drive system and FIG. 4b illustrates fluctuations in the electron energy levels thereof.
Figure 4B:
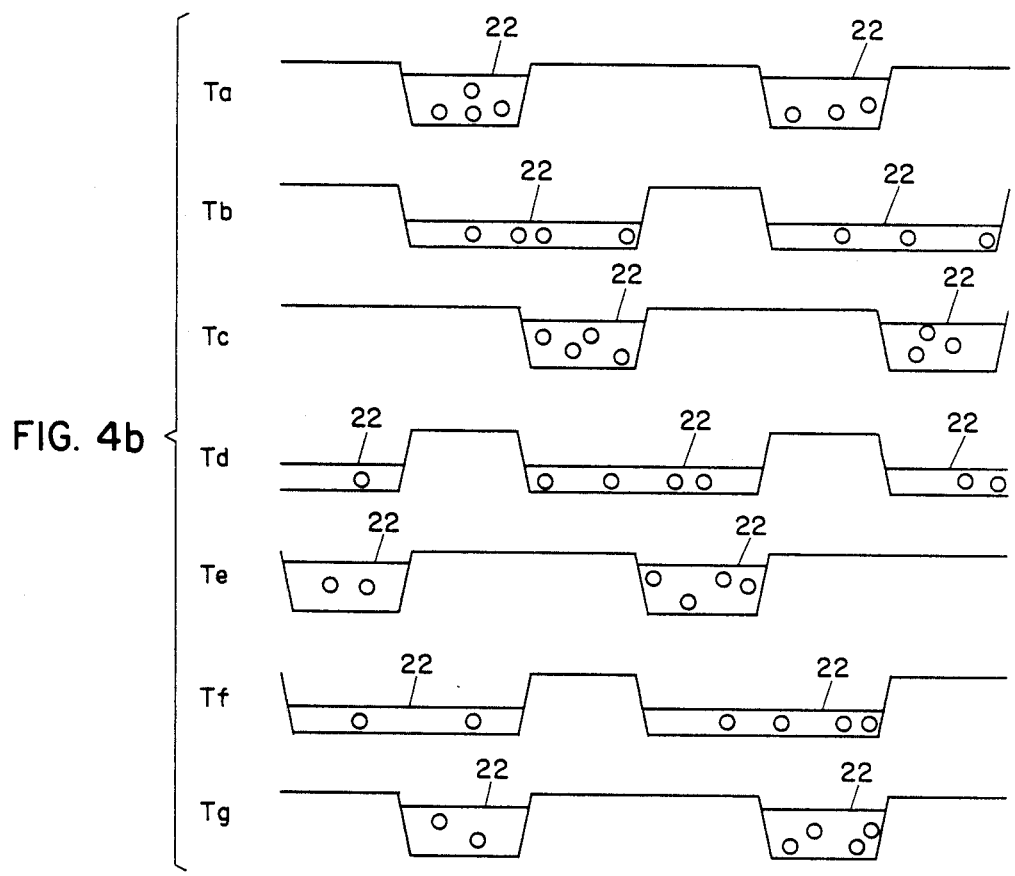
Figure 5:
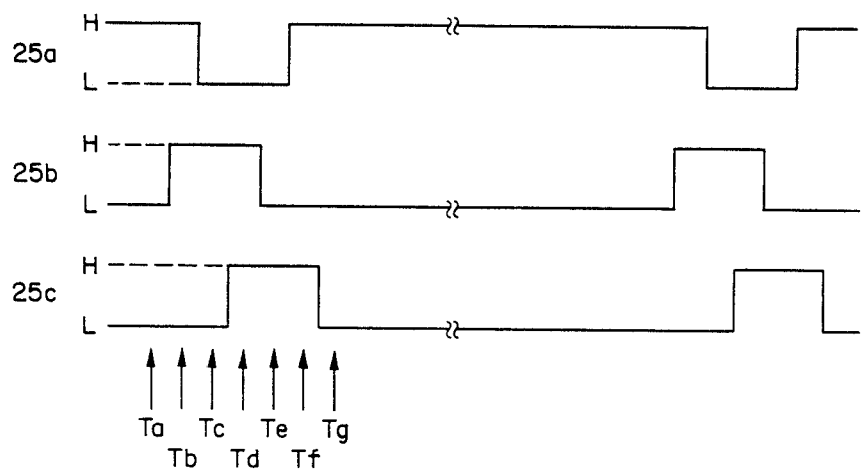
FIG. 5 is a timing chart for the transfer clock pulses applied to the CCD shown in FIG. 4.
Figure 6A:
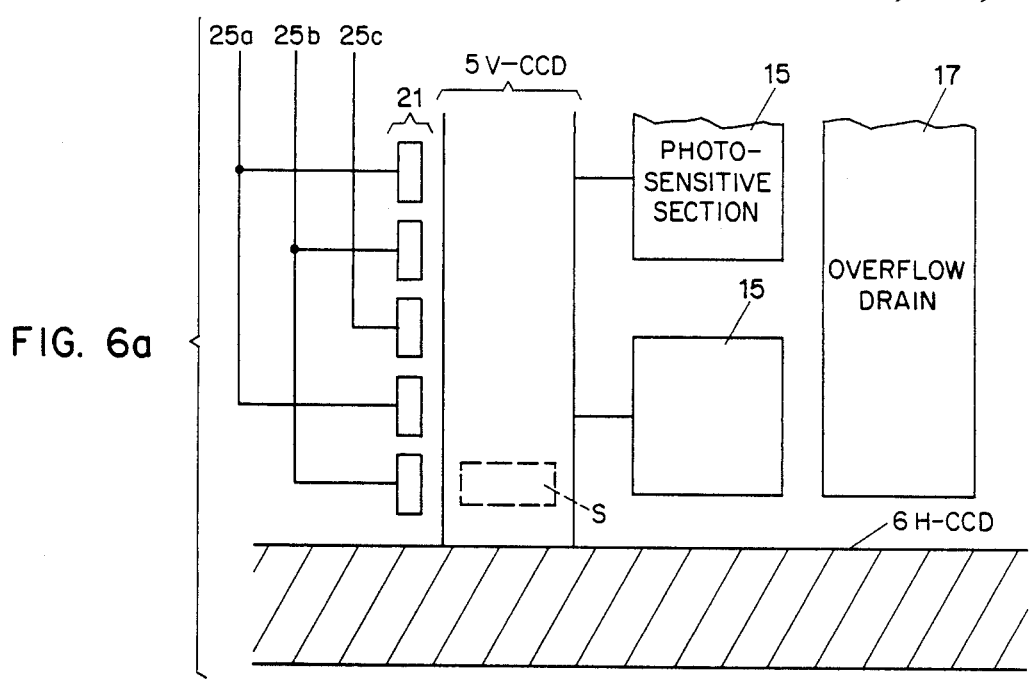
FIG. 6a is a schematic plan view illustrating a representative CCD arrangement in accordance with this invention and FIGS. 6b and 6c show the operation thereof.
Figure 6B:
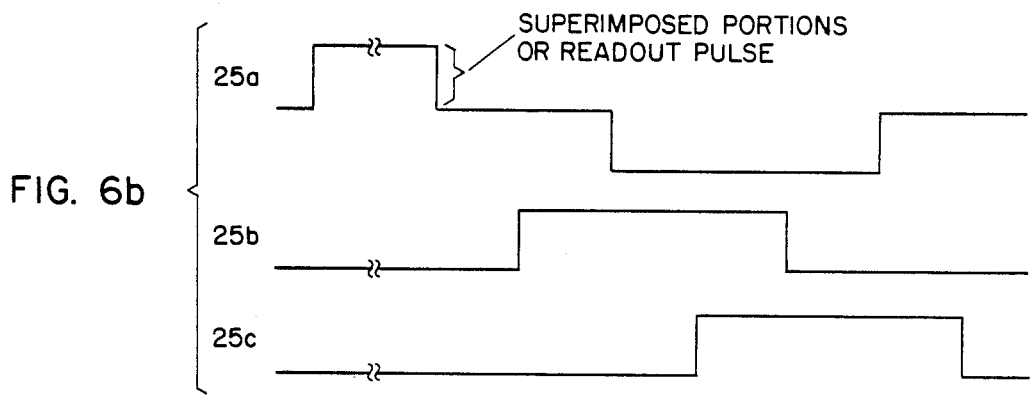
Figure 6C:
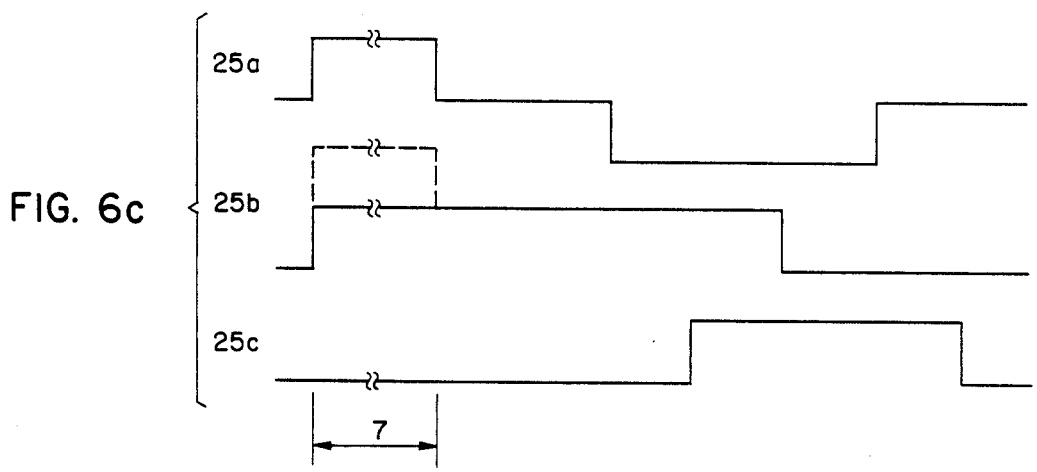

FIG. 6a illustrates a representative arrangement for solving the problems of the prior art in accordance with this invention and FIGS. 6b and 6c show the operation thereof. FIG. 6a is a schematic plan view of a regular CCD-type solid state image pickup device used in this invention corresponding to the plan view obtained when viewed from above in FIG. 1. Reference numeral 5 denotes a V-CCD corresponding to the V-CCD 13 in FIG. 1 including a photosensitive section 15, an overflow drain 17, a horizontal shift register 6 (H-CCD), a series of electrodes 21 positioned over the V-CCD 5, and three-phase transfer clocks 25a, 25b and 25c.

FIG. 6b is a timing chart for the three-phase transfer clocks 25a, 25b and 25c when this invention is not being used, and FIG. 6c is a timing chart for three-phase transfer clocks 25a, 25B and 25c when the invention is used, the interval 7 being the time during which a read-out pulse is applied.

As is clear from a comparison between FIGS. 6b and 6c, the corresponding three-phase transfer clocks have the same timing phase except for the transfer clocks 25b and 25B. Specifically, when the invention is not used, the clock shown in FIG 6b is used as the three-phase transfer clock while, when this invention is used, the clock shown in FIG. 6c is used, which provides the method for solving the prior art problems.

The operation will now be described with reference to FIGS. 6a, 6b and 6c.

When a read-out pulse 7 is applied and conventional vertical transfer clock signals 25a, 25b and 25c (FIG. 6b) are applied to the electrodes 21, a potential barrier is formed at the boundary between the V-CCD 5 and the H-CCD 6 shown by a broken-line area S at the time in which clock signal 25b is applied, so that useless electric charges to be discharged from the H-CCD 6 are prevented from flowing reversely to the V-CCD 5.

When this invention is carried out by applying vertical transfer clocks 25a, 25B and 25c as shown in FIG. 6c to the electrodes 21, the potential barrier present at the boundary represented by the broken-line area S is eliminated by vertical transfer clock 25B during the time in which the clock signal 25B is applied, i.e., at the point in time when a large amount of useless discarded electric charges, read out of the photosensitive section 15 and transferred via the V-CCD 5 to the H-CCD 6 at high speed, remain on the H-CCD 6. Thus, the useless charges on the H-CCD 6 may flow reversely through the V-CCD 5 to the nearest photosensitive section 15 and hence discharge to the overflow drain 17. The charges do not flow reversely to more remote photosensitive section because a potential barrier is formed midway in the passageway to the more remote photosensitive section.

In this way, the useless electric charges on the H-CCD 6 are efficiently discarded. Thereafter, the potential of transfer clock 25B may be raised to a level as high as the transfer clock 25a (to the extent to which the device is not damaged). Thus, when the lowered energy level of the V-CCD 5 is lowered below that of the overflow control gate 16, the maximum amount of electric charge can be discharged.

By this method, any distortion in the image occurs in only one pixel line comprising the nearest photosensitive section to H-CCD 6. If an image pickup device is used in which that one image line is a dummy, no image distortion will occur.

A Specific arrangement according to this invention will now be described with reference to FIGS. 7 and 8.

Figure 7:
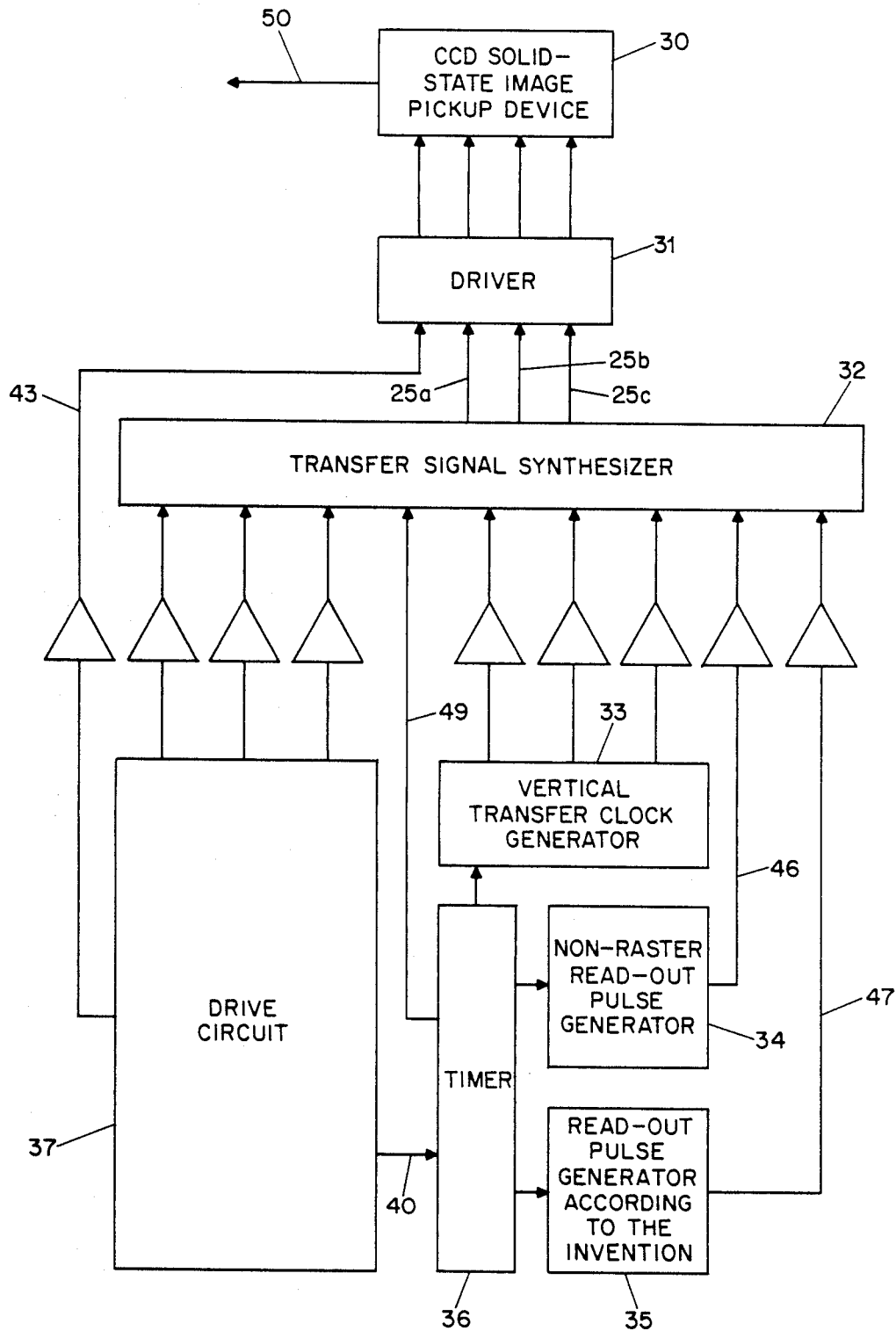
FIG. 7 is a schematic block diagram showing a representative embodiment of a CCD-type device arranged according to this invention.

FIG. 7 is a schematic block diagram showing a representative embodiment of this invention. In FIG. 7, the embodiment includes a CCD-type solid state image pickup device 30, a driver 31, a transfer signal synthesizer 32, a vertical transfer clock generator 33 for signal discharge, a read-out pulse generator 34 for nonraster scanning, a read-out pulse generator 35 for carrying out this invention, a timer 36 and a standard drive circuit 37.

Figure 8:
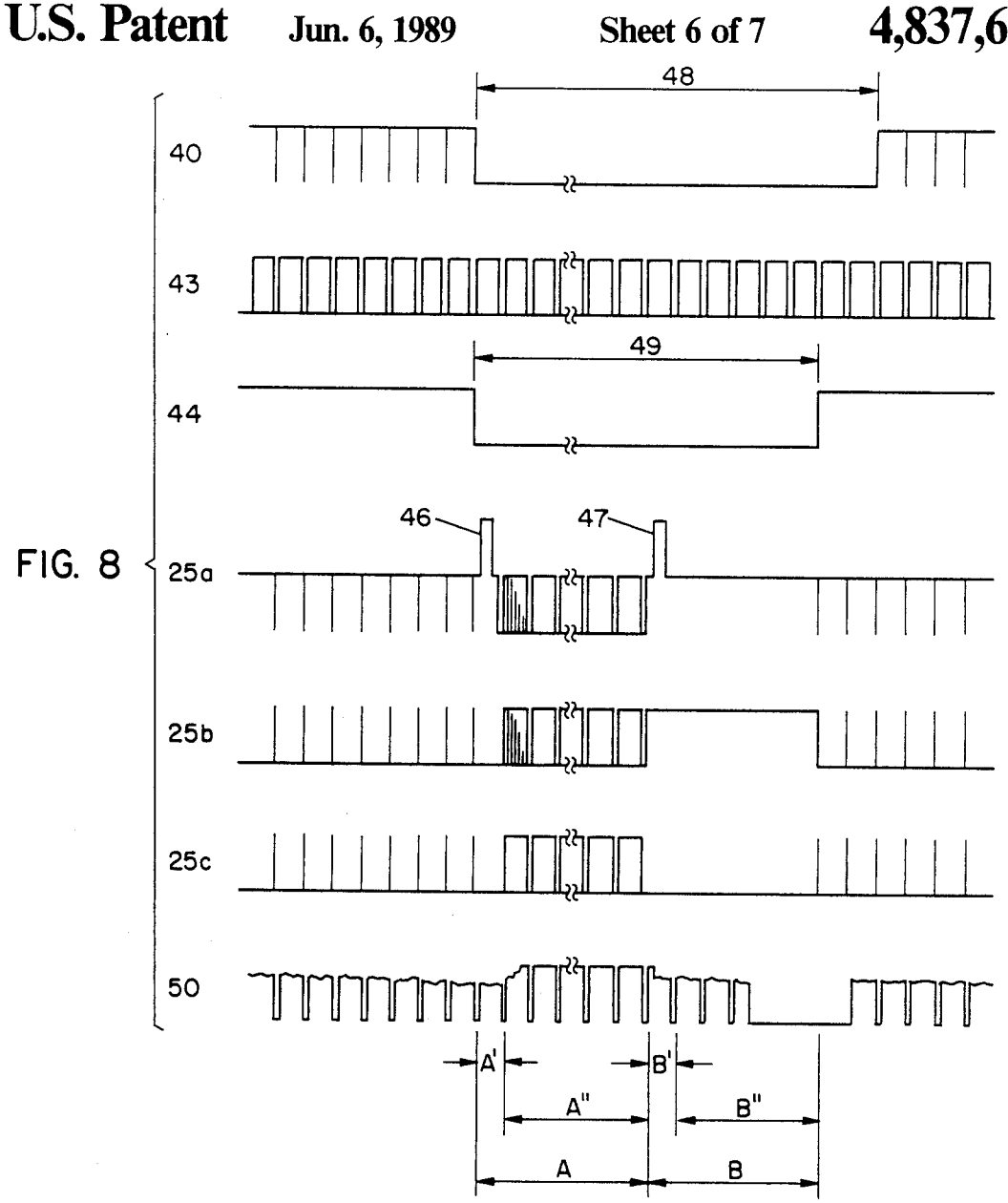
FIG. 8 is a timing chart for the signals at the selected locations in the circuit of FIG. 7.

FIG. 8 is a timing chart showing the signals at selected portions of the circuit of FIG. 7. In FIG. 8, reference numeral 40 denotes a blanking signal from the drive circuit 37 having a V-blanking interval 48, the signal 43 is a horizontal transfer clock from the drive circuit, the signal 44 is an image sweep-out (discharge) signal from the timer 46 with an image sweep-out (discharge) interval 49, the signals 25a, 25B and 25c are the three-phase vertical transfer clock signals from the transfer signal synthesizer 32 having an image sweep-out (discharge) read-out pulse 46 and a read-out pulse 47, and the signal 50 represents the device output.

The operation of the circuit will now be described with reference to FIGS. 7 and 8. The blanking signal 40 is supplied from the standard drive circuit 37 to the timer circuit 36. When the timer circuit 36 senses a V-blanking interval 48 in the blanking signal 40, it supplies a signal indicative of the image sweep-out interval 49 to the transfer signal synthesizer 32, which, during that interval operates so as to block a signal from the standard drive circuit 37 from being transferred and to supply signals from the signal discharge vertical transfer clock generator 33 and the read-out pulse generators 34 and 35.

The timer circuit 36 generates a signal indicative of an interval of A″ to cause discharge of the vertical transfer clock generator 33, a signal indicative of an interval of A′ to the read-out pulse generator 34, and a signal indicative of an interval of B′ to the read-out pulse generator 35 to operate the respective circuits for only those corresponding intervals. During the interval B″, all of the vertical transfer clocks 25a, 25B and 25c are stopped, and only the electric charges on the H-CCD 6 are discharged by the horizontal transfer clock 43 from the standard drive circuit 37.

Figure 9A:
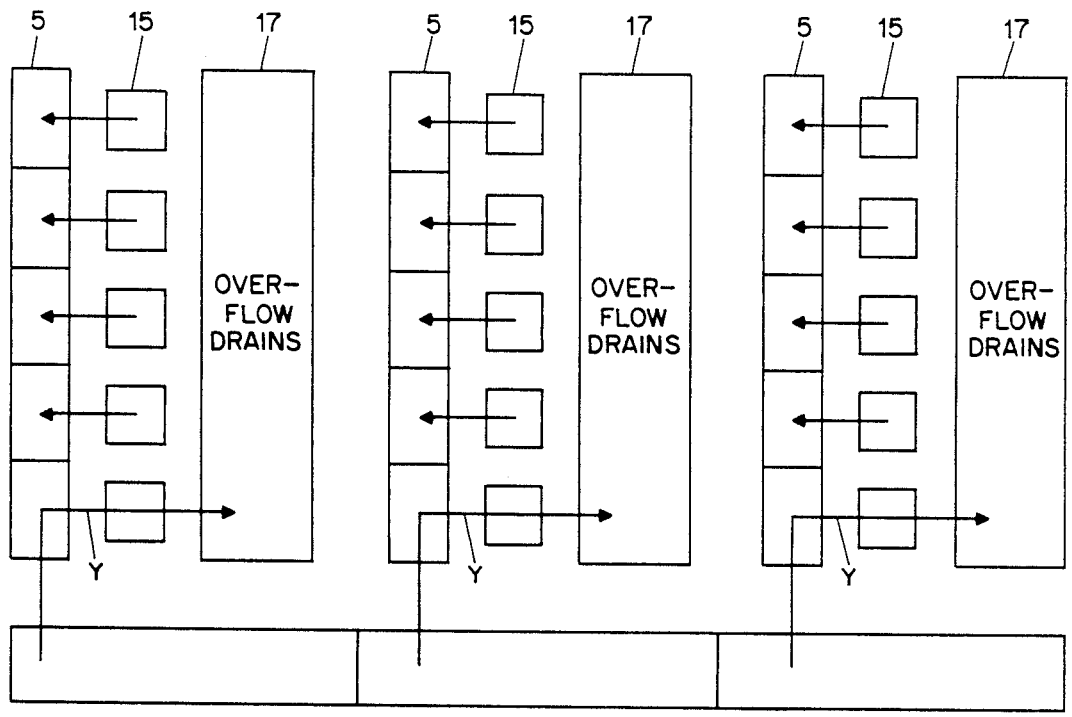
FIGS. 9a and 9b illustrate the operational mode of this invention.
Figure 9B:
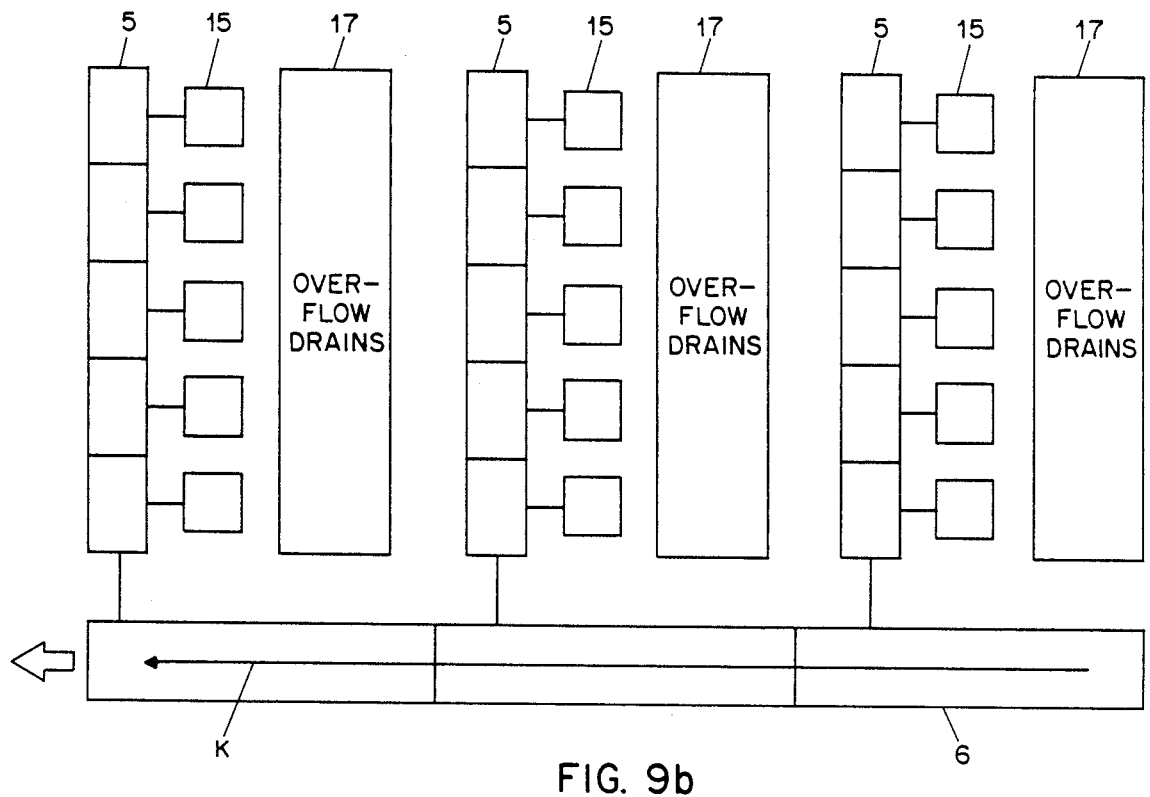

This embodiment has been described with respect to the three-phase V-CCD-type solid state image pickup device. In FIG. 8, reference character A denotes a nonraster scanning interval and B an electric charge discharge interval according to this invention. The interval B′ is the one during which the electric charges on the H-CCD 6 flow reversely, as shown by the arrow Y in FIG. 9a, and the interval of B″ is the one in which the electric charges on the H-CCD 6 discharge to others, as shown by the arrow K in FIG. 9b.

According to this invention, the efficiency of discharging useless signal electric charges is improved in the H-CCD (horizontal shift register) of a CCD-type solid state image pickup device, thereby solving the conventional problem of distortion of part of the received image which degrades the image quality.

Although the invention has been described herein with reference to specific embodiments, many modifications and variations therein will occur to those skilled in the art. Accordingly, all such variations and modifications are included within the intended scope of the invention.

We claim:

1. An image pickup method using a CCD-type solid state image pickup device including a photoelectric conversion element having an overflow drain structure, a vertical CCD register for receiving electric charges from the photoelectric conversion element having a potential barrier which is lowered to permit transfer of charges from the photoelectric conversion element, and a horizontal CCD register for receiving electric charges from the vertical CCD register, comprising the steps of transferring the electric charges which the vertical CCD register has received from the photoelectric conversion element to the horizontal CCD register at a first time during a vertical blanking interval in accordance with a first transfer clock at a higher speed than the electric charges are normally read out, discharging the electric charges from the horizontal CCD register, transferring electric charges from the photoelectric conversion element to the vertical CCD register at a second time after a predetermined time within the vertical blanking interval, supplying as an output signal the electric charges transferred from the vertical CCD register to the horizontal CCD register in accordance with a second transfer clock having a normal reading-out speed, using the time interval between the first and second times as an image-receiving interval, and lowering the potential barrier on the vertical CCD register in a particular clock phase which the first transfer clock assumes during the step of discharging the electric charges from the horizontal CCD register, thereby permitting any electric charges remaining on the horizontal CCD register to flow reversely to the photoelectric conversion element via the vertical CCD register and to be discharged from the overflow drain of the conversion element without being hindered by the barrier.

* * * * *